Patented Apr. 19, 1932

1,854,553

UNITED STATES PATENT OFFICE

JOHN W. LIVINGSTON, OF HAMBURG, NEW YORK, ASSIGNOR TO NATIONAL ANILINE & CHEMICAL CO., INC., OF NEW YORK, N. Y., A CORPORATION OF NEW YORK

PRODUCTION OF N-SUBSTITUTED AMINES

No Drawing. Application filed May 10, 1926. Serial No. 108,166.

This invention relates to a process for the production of N-substituted amines, and particularly ethylbenzylaniline, in the presence of an organic hydrocarbon solvent.

In the production of ethylbenzylaniline, it has been heretofore proposed to subject monoethylaniline to the action of rectified benzyl chloride with heating under a reflux condenser and in the presence of an aqueous solution of soda ash as an acid binding agent for neutralizing the hydrochloric acid as it is formed during the reaction.

According to the present invention, the production of ethylbenzylaniline is effected by subjecting monoethylaniline to the action of benzyl chloride, preferably in the presence of an acid binding agent, in the presence of a liquid hydrocarbon solvent, preferably in the presence of a hydrocarbon of the benzene series as a solvent. In the halogenation of alkyl side-chains in aromatic hydrocarbons of the benzene series, in the absence or presence of suitable catalysts, and particularly in the chlorination of toluene for the production of benzyl chloride, it is often the practice to carry out the halogenation in such a manner and to such an extent that only a portion of the hydrocarbon is halogenated whereby a solution or an admixture of unchanged hydrocarbon and its monohalogenated derivative is obtained. The present invention particularly contemplates the use of the solution or admixture of a hydrocarbon and its monohalogen derivative, which can be thus obtained, in effecting the production of N-substituted amines; and it is especially concerned with the production of ethylbenzylaniline by treating monoethylaniline with the crude and unrectified toluene solution of benzyl chloride which can be obtained by the partial or incomplete chlorination of toluene.

The following example will further illustrate the invention, but it is understood that the invention is not limited thereto. The parts are by weight.

*Example*—To a kettle containing 2000 parts of water, there is added 600 parts of soda ash, 870 parts of monoethylaniline, and then 1043 parts of benzyl chloride dissolved in an about equal amount of toluene. The mixture is gradually brought to refluxing temperature, or about 102° C., over a period of three to five hours, and is then refluxed for about 15 hours, or until a sample of the reaction mixture treated with an equal weight of acetic anhydride at the same temperature, shows no more than a 3° to 5° C. rise in temperature. When the reaction is finished, the mixture is distilled and the ethylbenzylaniline is separated. Toluene is also recovered during the distillation.

A suitable method of carrying out the distillation and separation of the toluene and ethylbenzylaniline consists in cooling the mixture to about 60° C., adding 250 parts of soda ash and steam distilling with vigorous agitation to drive off the toluene, benzyl alcohol and any excess benzyl chloride. This is continued until a sample sinks quickly to the bottom when added to cold water. After cooling to about 60° C., the soda ash solution is drawn off, and the residue heated until it is free from water leaving ethylbenzylaniline. For further purification, the product may be distilled if necessary, under reduced pressure.

In the above example, the use of benzyl chloride in admixture with the toluene from which it is derived avoids separation of the benzyl halide and its attendant difficulties. These difficulties are in part due to the readiness with which benzyl chloride attacks ordinary distillation apparatus, and the separation accordingly requires special apparatus and careful manipulation. After benzylation, however, any ordinary iron apparatus can be used for the recovery of toluene, as by steam distillation.

It may be further pointed out that in the above example, a monoethylaniline containing diethylaniline may also be employed, in which case it is subsequently recovered along with the toluene by steam distillation.

The process described is evidently applicable to the formation of N-substituted amines, generally and it is also available for the introduction of radicals other than benzyl. Accordingly, the invention is not to be regarded as restricted to the formation of ethylbenzylaniline, specified in the example since other benzylated amines or benzylated alkylaniline compounds may be produced by substituting other secondary arylamines or alkylaniline compounds for the monoethylaniline used therein, or to benzylation generally as in place of benzyl chloride other aralkyl mono halides having a halogen atom bound to an aliphatic carbon atom may be used. Furthermore, while in the case of benzylation, toluene is a preferred organic solvent, other solvents can be used, either in place of or in conjunction with toluene.

I claim:

1. In a process of benzylating monoethylaniline, the improvement which comprises subjecting it to the action of benzyl chloride in the presence of toluene.

2. In a process of benzylating monoethylaniline in admixture with diethylaniline, the improvement which comprises subjecting the mixture to the action of benzyl chloride in the presence of toluene and an inorganic acid-binding agent.

3. In the production of a benzylated amine a process which comprises subjecting a secondary arylamine to the action of a toluene solution of a benzyl halide in the presence of an inorganic acid binding agent, and fractionating the resultant product for the separation of toluene and the benzylated arylamine.

4. A process which comprises benzylation of monoethylaniline with toluene partially converted into benzyl chloride, neutralizing the hydrochloric acid formed during benzylation, and fractionating the resulting product for the recovery of toluene and ethylbenzylaniline.

5. In the production of ethylbenzylaniline a process which comprises subjecting monoethylaniline admixed with diethylaniline to the action of a toluene solution of benzyl chloride in the presence of an inorganic acid-binding agent, and fractionating the resulting product for the recovery of toluene, diethylaniline and ethylbenzylaniline.

6. In a process of introducing an organic hydrocarbon radical into an amino group of an organic amine, the improvement which comprises reacting a secondary arylamine with a benzyl halide, said reaction taking place in the presence of an inert liquid hydrocarbon solvent.

7. In the process of introducing a benzyl radical into an amino group of a secondary phenylamine, the improvement which comprises heating the organic amine with a benzyl halide in the presence of an inert hydrocarbon solvent.

8. In the process of introducing a benzyl radical into the amino group of a monoalkylated arylamine of the benzene series, the improvement which comprises reacting the mono-alkylated arylamine with benzyl chloride in the presence of toluene.

9. A process which comprises halogenating toluene to produce a benzyl halide, reacting the crude halogenation mixture which contains unchanged toluene with a secondary arylamine in the presence of an acid binding agent, and fractionating the resultant product for the recovery of toluene and of the benzylated amine.

10. A process which comprises chlorinating toluene to produce benzyl chloride, reacting the crude chlorination mixture which contains unchanged toluene with a secondary arylamine in the presence of an acid binding agent, and fractionating the resultant product for the recovery of toluene and of the benzylated amine.

11. A process which comprises chlorinating toluene to produce benzyl chloride, reacting the crude chlorination mixture which contains unchanged toluene with a monoalkylaniline in the presence of an acid binding agent, and fractionating the resultant product for the recovery of toluene and of the benzylated alkylaniline.

12. A process which comprises chlorinating toluene to produce benzyl chloride, reacting the crude chlorination mixture which contains unchanged toluene with ethylaniline in the presence of an acid binding agent, and fractionating the resultant product for the recovery of toluene and of the benzylated ethylaniline.

13. A process for the production of a benzyl alkylarylamine which comprises reacting a benzyl halide with an alkylarlyamine, said reaction taking place in the presence of a liquid hydrocarbon as a solvent.

14. A process for the production of a benzyl alkylarylamine which comprises reacting a benzyl chloride with an alkylarylamine, said reaction taking place in the presence of a liquid hydrocarbon as a solvent.

15. A process for the production of a benzyl alkylarylamine which comprises reacting benzyl chloride with an alkylarylamine, said reaction taking place in the presence of a liquid hydrocarbon as a solvent.

16. In a process of benzylating a secondary arylamine the improvement which comprises reacting the secondary arylamine with a benzyl halide in the presence of a hydrocarbon of the benzene series as a solvent.

17. In a process of benzylating a secondary monoalkylarylamine the improvement which comprises reacting the monoalkylarylamine with a benzyl halide in the presence of a hydrocarbon of the benzene series as a solvent.

18. In a process of benzylating a secondary phenylamine the improvement which comprises reacting the secondary phenylamine with a benzyl halide in the presence of a hydrocarbon of the benzene series as a solvent.

19. In a process of benzylating a monoalkylphenylamine the improvement which comprises reacting the monoalkylphenylamine with a benzyl halide in the presence of a hydrocarbon of the benzene series as a solvent.

20. In a process of benzylating a monoalkylaniline the improvement which comprises reacting the monoalkylaniline with a benzyl halide in the presence of a hydrocarbon of the benzene series as a solvent.

21. In a process of benzylating monoethylaniline the improvement which comprises reacting monoethylaniline with a benzyl halide in the presence of a hydrocarbon of the benzene series as a solvent.

22. In a process of benzylating monoethylaniline the improvement which comprises reacting monoethylaniline with benzyl chloride in the presence of a hydrocarbon of the benzene series as a solvent.

23. In a process of benzylating a secondary monoalkylarylamine the improvement which comprises reacting the secondary monoalkylarylamine with a benzyl halide in the presence of toluene as a solvent.

24. In a process of benzylating a secondary phenylamine the improvement which comprises reacting the secondary phenylamine with a benzyl halide in the presence of toluene as a solvent.

25. In a process of benzylating a monoalkylaniline the improvement which comprises reacting the monoalkylaniline with a benzyl halide in the presence of toluene as a solvent.

26. In a process of introducing an aralkyl radical into an amino group of a secondary arylamine, the improvement which comprises reacting a secondary arylamine with an aralkyl mono-halide in the presence of an inert liquid hydrocarbon as a solvent.

In testimony whereof I affix my signature.

JOHN W. LIVINGSTON.